Oct. 4, 1932.   F. CHARAVAY   1,880,313
PROPELLER BALANCING MECHANISM
Filed May 22, 1931   4 Sheets-Sheet 2

INVENTOR
Frederick Charavay
BY
Toulmin & Toulmin
ATTORNEYS

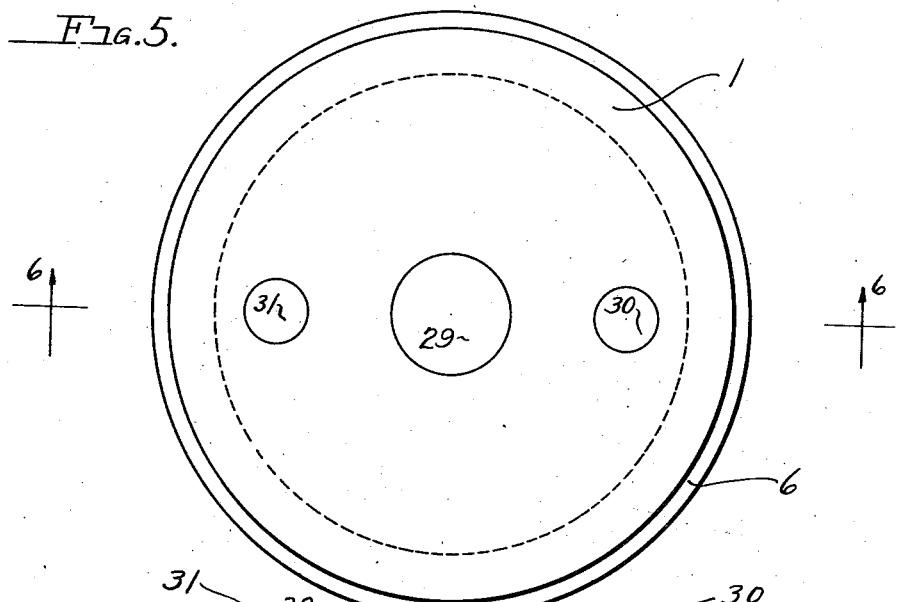
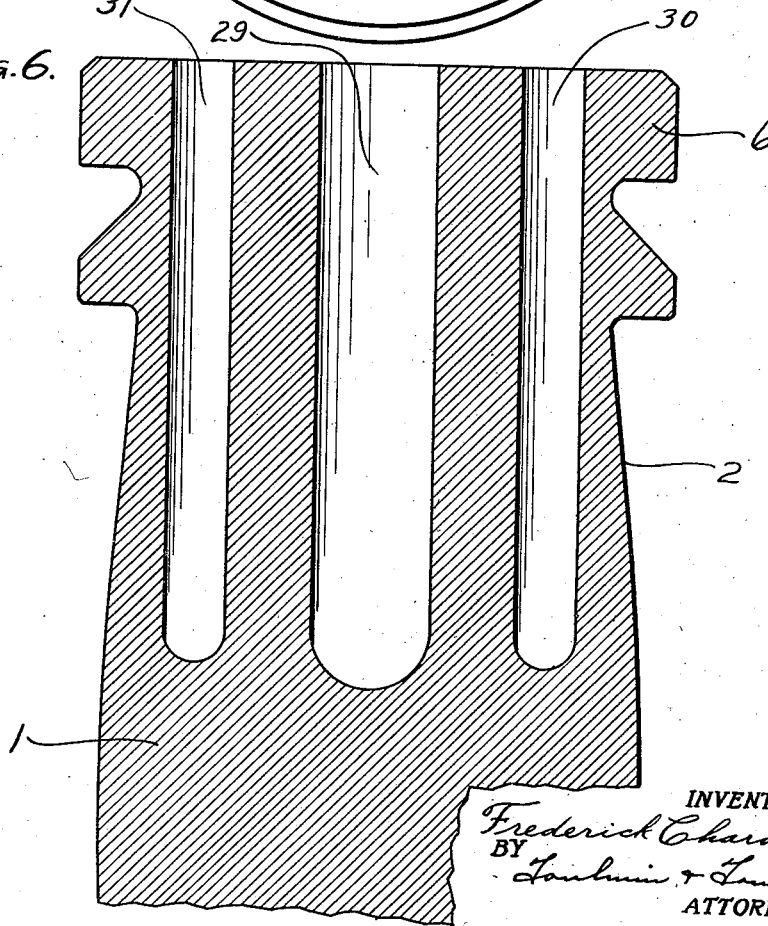

Patented Oct. 4, 1932

1,880,313

UNITED STATES PATENT OFFICE

FREDERICK CHARAVAY, OF PIQUA, OHIO, ASSIGNOR OF ONE-HALF TO HARTZELL INDUSTRIES, INC., OF PIQUA, OHIO, A CORPORATION OF DELAWARE

PROPELLER BALANCING MECHANISM

Application filed May 22, 1931. Serial No. 539,209.

My invention relates to a mechanism and method for balancing airplane propellers.

While my invention is adaptable to balance various types of mechanism where it is necessary that each piece of mechanism have the same balance, yet I have particularly designed and use it for balancing airplane propellers.

Heretofore balancing of airplane propellers has been largely a matter of repeated individual adjustment until the approximate result was obtained, or it has been a matter for very compli ated mathematical calculations.

It is my object to provide apparatus which is very accurate, very fast, and can be accomplished by an ordinary workman, thereby reducing the balancing of propeller blades, which has heretofore been confined to persons of great skill, to an ordinary production job with the use of ordinary mechanics.

It is my object to provide means by which the airplane propellers have a predetermined cavity in the shank of the propeller blade and provision for additional cavities, and may have a predetermined portion of such cavities filled with a weighting material to accomplish the predetermined balancing of the propeller.

It is a further object to provide a normally open central shank cavity which can be filled with lead or other weighting material, and it is a further object to provide space for inserting side cavities in which weighting material can be inserted, which weight is the difference between the metal removed from the propeller and the weighting material, such as lead, that is restored in order to make up the balance in the shank of the propeller blade.

It is a further object to provide a balancing mechanism in which the propeller blade being balanced can be immediately locked in position and balanced loaded or a record made of the loading for balancing and then the propeller blade can be immediately removed so that the loading of the propeller shank can take place elsewhere while a new blade is being balanced.

Referring to the drawings, Figure 1 is a front elevation of my propeller balancing mechanism with the propeller blade in position.

Figure 5 is a top plan view of the propeller shank in which the central cavity and side cavities have been formed.

Figure 6 is a section on the line 6—6 of Figure 5.

Figure 1:
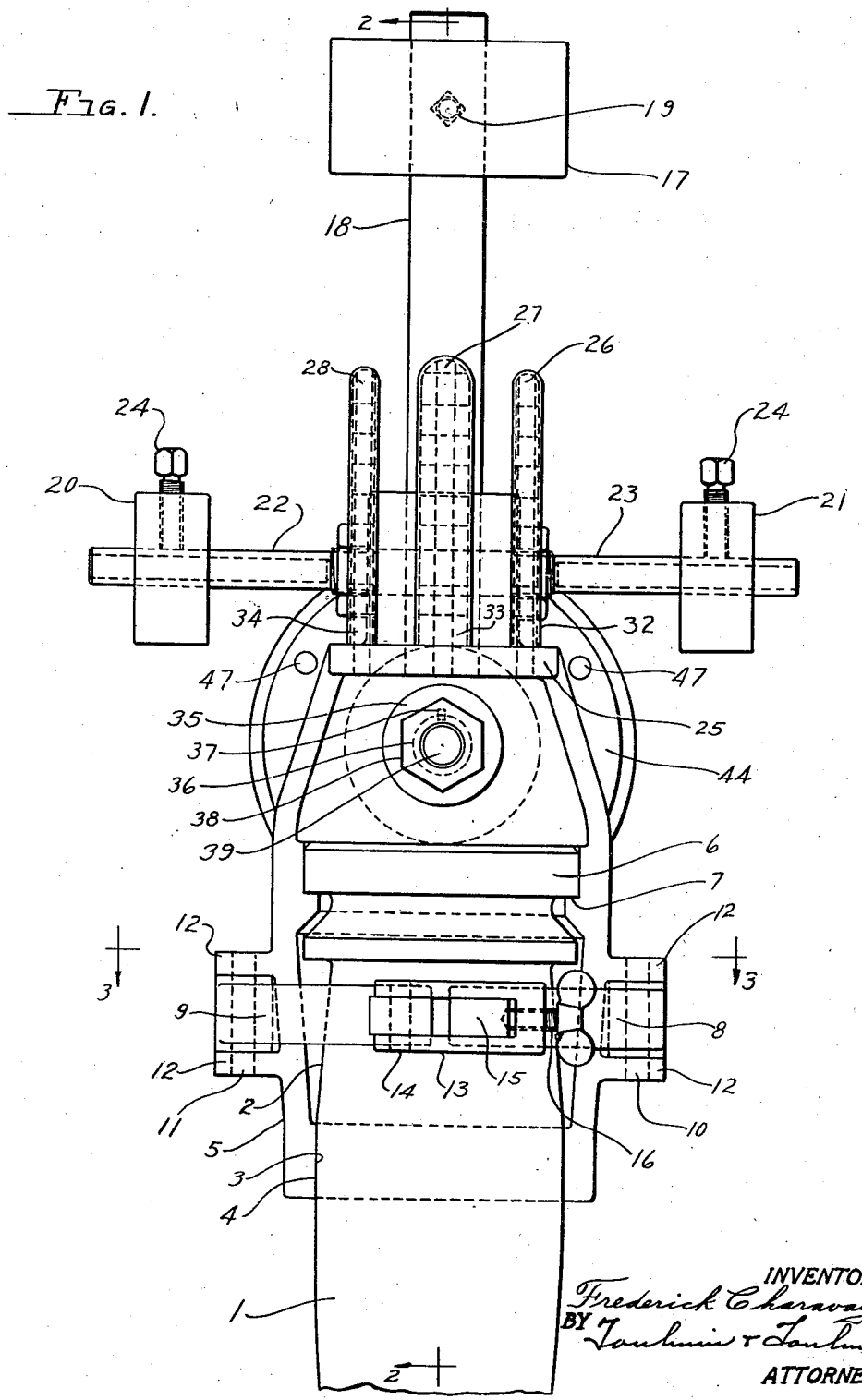
Figure 2:
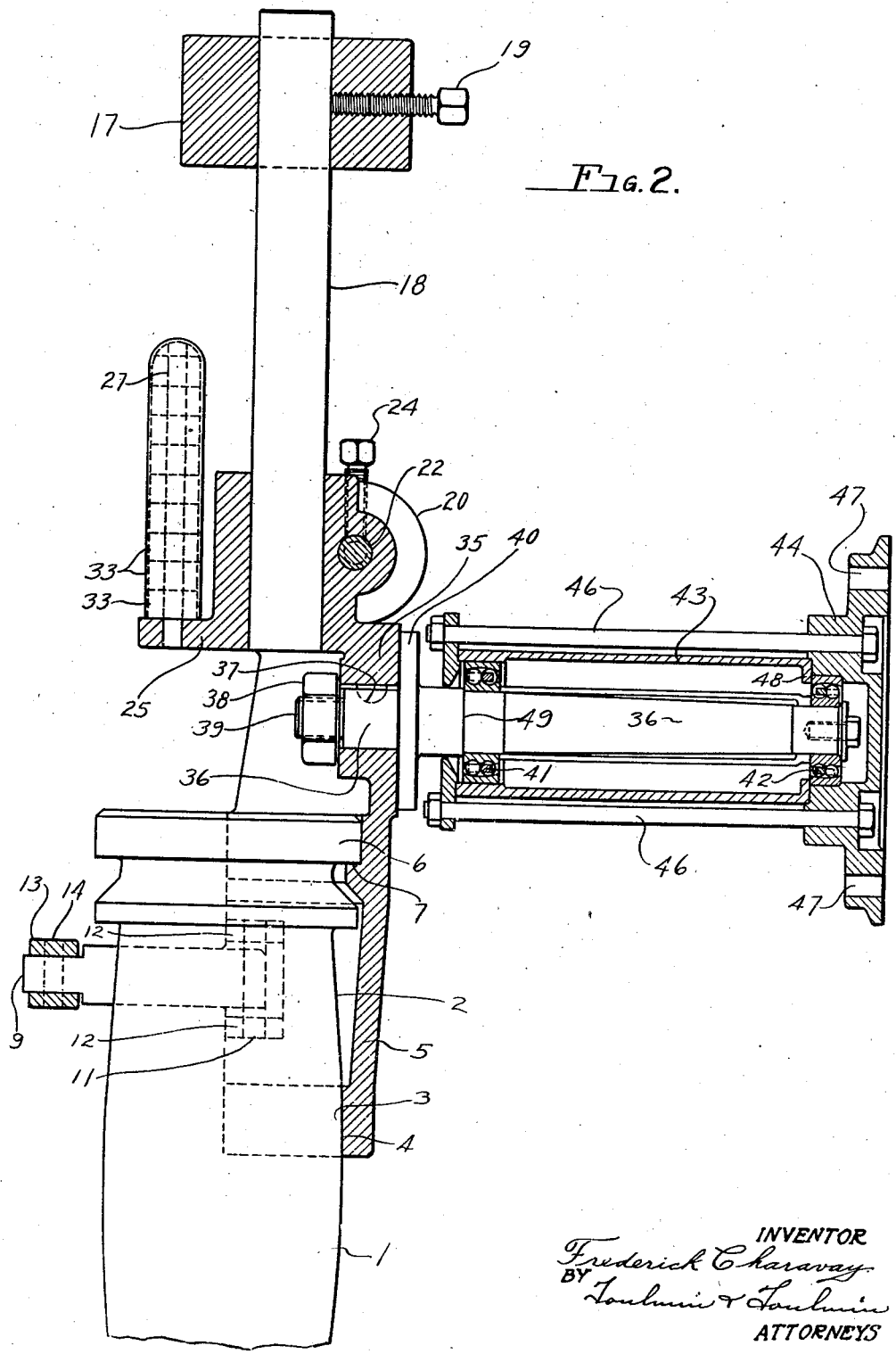
Figure 2 is a section on the line 2—2 thereof.
Figure 3:
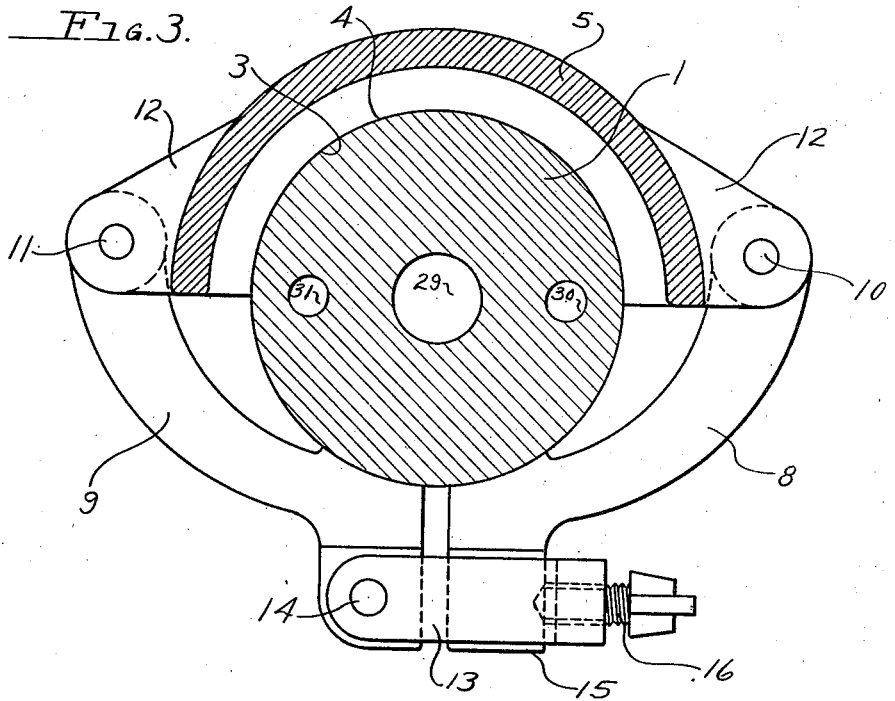
Figure 3 is a section on the line 3—3 thereof.
Figure 4:
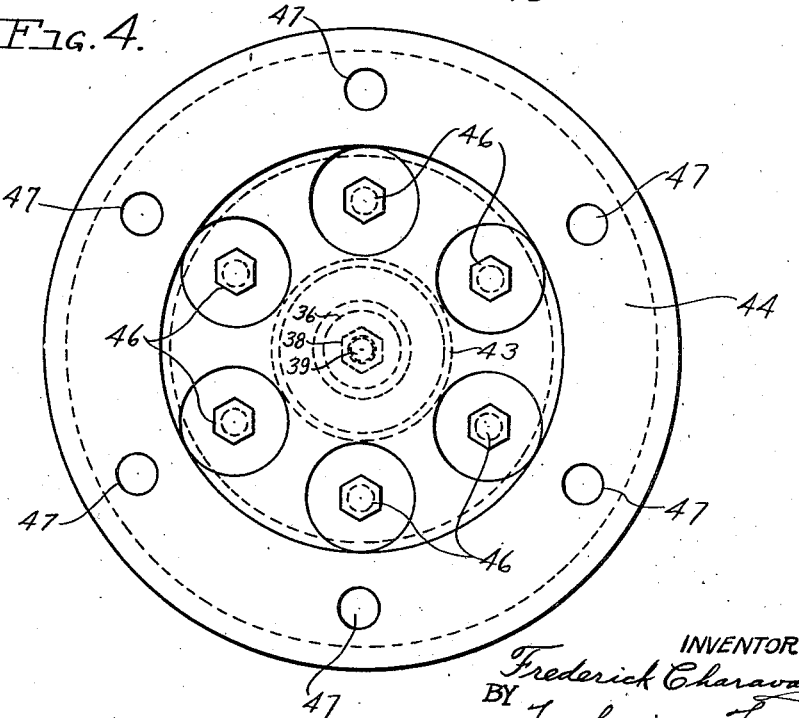
Figure 4 is a rear elevation of the balancing mechanism looking at the mechanism in Figure 2 from the right-hand side of Figure 2.

My method of balancing airplane propellers in conjunction with this apparatus is as follows:—

The first step is to place a master blade having a central opening as indicated in Figures 5 and 6 in position in the testing apparatus and balance it in a vertical position. The propeller blade is indicated at 1, which may be either the master blade or the blade being balanced. This blade is provided with a shank 2 which engages at 3 with the semicircular arcuate face 4 of a depending skirt 5 that carries the shank of the propeller blade. The shank of the blade is provided with a shoulder 6 which rests upon the shoulder 7 of the skirt 5. The propeller blade is quickly clamped in position by the bifurcated clamp clamping the arms 8 and 9 that are respectively pivoted at 10 and 11 to ears 12 formed on the semi-circular skirt 5. The arms 8 and 9 of this clamp are connected together by a pivoted bale 13, pivoted at 14 on the arm 9. The arm 8 is provided with a nose 15 which projects through the opening in the bale. Mounted in the bale 13 is a locking screw 16 which engages with the nose 15 of the arm 8. Thus the arms are held in locking engagement with the shank 2 of the propeller blade 1. This operation is very quick. The position of the propeller shank vertically is established positively and uniformly by the shoulders 6 and 7.

The first step in the balancing of the master blade or the setting of the balancing machine to the balance of the master blade is to place the master blade in a vertical position and adjust the weights 20 and 21 on the horizontal weight supports 22 and 23. These weights are positioned by the set screws 24. It will be noted that these weight supports 22 and 23 are hollow.

Mounted on the face of the balancing mechanism is a shelf 25 having three vertically disposed pins 26, 27 and 28, disposed in the same relative position as the central opening 29 and side openings 30 and 31 in the shank 2 of the propeller blade 1.

Mounted upon these pins 26, 27 and 28 are a series of weights, preferably of lead, designated respectively 32, 33 and 34.

The standard blade is then brought to a horizontal balance in a horizontal position by the adjustment of the weight 17 on the weight support 18 by use of the set screw 19. When the blade is thus adjusted, the weight 17 is thereafter used as a standard of balance for balancing in horizontal position the propeller blades that are to be balanced.

The balancing mechanism is supported on a hub 35 which is mounted on an axle 36 and keyed thereto by a key 37. It is retained on the axle 36 by the nut 38 on the threaded end 39 of the axle which holds the hub 35 against the shoulder 40 on the axle. This axle is mounted at spaced intervals in ball bearings 41 and 42 which are carried respectively within a sleeve 43 and a supporting plate 44. The sleeve 43 and outer bearings 41 are retained in position by the shoulder 46 carried by the supporting plate 44. The supporting plate is usually attached to a rigid standard by bolts passing through the apertures 47.

The sleeve 43 is provided with shoulders 48 to retain the bearings 42 in position in the shouldered support for the bearings in the supporting plate 44. The outer bearings 41 bear against a shoulder 49 on the axle 36.

When the vertical balance is to be obtained, the blade is then placed in vertical position and a sufficient number of weights 26 and 28 are removed to bring it to a vertical position of balance. When this is accomplished, a hole 30 or 31 is drilled in the propeller shank to the extent necessary to receive a number of weights 26 or 28 on the side from which said weights have been removed. The amount of lead corresponding to such weights will be inserted in either or both of the openings 30 and 31. Such weights represent the difference between the amount of aluminum, if the blade is made of aluminum, removed and the amount of lead restored.

When it is desired to balance a propeller blade horizontally, it is locked in position as indicated, and is balanced horizontally by removing the weights 27. These weights so removed correspond to the amount of lead that is to be placed eventually within the central openings 29 of the propeller blade shank. This accomplishes the balancing of the propeller blade horizontally.

The heighth of the columns of weights 26, 27 and 28 correspond respectively to the depth of the holes 29, 30 and 31. The lateral spacing between these columns of weights correspond to the lateral spacing of the holes 29, 30 and 31. The dimensions of the holes correspond to the dimensions of the weights laterally.

It will be understood that I desire to comprehend within my invention such modifications as may be necessary to adapt it to varying conditions and uses.

Having thus fully described my invention, what I claim as new and desire to secure by Letters Patent, is:

1. In combination, in a balancing mechanism for propellers, a freely rotatable balancing support, counter-balancing standard weights and a quick detachable connection for supporting the propeller blade to be balanced, and means for aligning said propeller blade to be balanced at a predetermined distance from the center of the pivoted support of the balancing mechanism, and means for supporting a plurality of detachable weights in columns on said balancing mechanism.

2. In combination, a supporting axle, a balancing mechanism mounted thereon, means for freely supporting said axle, vertical and horizontal arms on said balancing mechanism, weight standards adjusted thereon to a predetermined balance, and means opposite said axle for supporting a propeller blade to be balanced.

3. In combination, a supporting axle, a balancing mechanism mounted thereon, means for freely supporting said axle, vertical and horizontal arms on said balancing mechanism, weight standards adjusted thereon to a predetermined balance, and means opposite said axle for supporting a propeller blade to be balanced, and means for aligning said propeller blade a predetermined distance from said axle center.

4. In combination, a supporting axle, a balancing mechanism mounted thereon, means for freely supporting said axle, vertical and horizontal arms on said balancing mechanism, weight standards adjusted thereon to a predetermined balance, and means opposite said axle for supporting a propeller blade to be balanced, and means for aligning said propeller blade a predetermined distance from said axle center, and means to support a plurality of columns of detachable weights.

5. In combination, a supporting axle, a balancing mechanism mounted thereon, means for freely supporting said axle, vertical and horizontal arms on said balancing mechanism, weight standards adjusted thereon to a predetermined balance, and means opposite said axle for supporting a propeller blade to be balanced, and means for aligning said propeller blade a predetermined distance from said axle center, and means to support a plurality of columns of detachable weights, said columns comprising a central column and side columns.

6. In combination, a balancing mechanism comprising a freely rotatable support, vertical and horizontal arms mounted on said support, standard weights thereon, three columns of vertically disposed detachable weights corresponding in diameter and heighth to corresponding apertures in the shank of the propeller blade being balanced.

7. In combination, a balancing mechanism comprising a freely rotatable support, vertical and horizontal arms mounted on said support, standard weights thereon, three columns of vertically disposed detachable weights corresponding in diameter and heighth to corresponding apertures in the shank of the propeller blade being balanced, said central weights being equal to the capacity of the central aperture in the shank and said side weights being equal to the difference between the material removed to form the side apertures and the material inserted therein.

8. In combination, an axle, means for freely supporting said axle, a balancing mechanism mounted on said axle, a detachable clamp for supporting a propeller blade on said balancing mechanism, a shoulder on said balancing mechanism engaging a shoulder on said propeller blade for aligning it, a vertically disposed weight support opposite said propeller blade, horizontally disposed weight supports opposite said propeller blade, adjustable weights thereon calibrated to a fixed position according to the balance of a master blade, means of supporting a plurality of columns of detachable weights.

9. In combination, an axle, means for freely supporting said axle, a balancing mechanism mounted on said axle, a detachable clamp for supporting a propeller blade on said balancing mechanism, a shoulder on said balancing mechanism engaging a shoulder on said propeller blade for aligning it, a vertically disposed weight support opposite said propeller blade, horizontally disposed weight supports opposite said propeller blade, adjustable weights thereon calibrated to a fixed position according to the balance of a master blade, means of supporting a plurality of columns of detachable weights, said weights being arranged in columns of size and height and position corresponding to apertures in the shank of the oppositely disposed propeller blade.

10. In combination, in a propeller balancing mechanism, means of freely supporting a balancing mechanism, means of detachably retaining a propeller blade on one side of said support, means of supporting vertically and horizontally calibrated fixed weights, and means of supporting opposite to the shank of said propeller blade in the same relationship to the support for the balancing mechanism as that occupied by said propeller blade shank, a plurality of detachable weights arranged in equi-distant symmetrical columns.

11. In combination, means for freely supporting a balancing mechanism, attaching a propeller on one side thereof, means to support vertically and horizontally calibrated weights on the other side thereof, and means of supporting a plurality of detachable weights, removable for balancing said propeller blade and for determining the amount of change in said propeller blade as to weight and position of said weight in the shank thereof to balance it.

12. In combination in a balancing mechanism for propellers, a stationary sleeve having spaced bars therein, an axle mounted in said sleeve extending outward from said bars, a hub mounted on said sleeve, a depending skirt from said hub having a propeller blade supporting shoulder, clamping jaws mounted on said skirt adapted to have their inner ends interlock and retain said propeller blade shank on said shoulder.

13. In combination in a balancing mechanism for propellers, a stationary sleeve having spaced bars therein, an axle mounted in said sleeve extending outward from said bars, a hub mounted on said sleeve, a depending skirt from said hub having a propeller blade supporting shoulder, clamping jaws mounted on said skirt adapted to have their inner ends interlock and retain said propeller blade shank on said shoulder, a weight support extending oppositely from said skirt comprising a vertical rod and oppositely disposed horizontal rods, adjustable weights mounted thereon, a plurality of pins mounted on said support and a plurality of detachable weights mounted on said pins.

14. In a propeller balancing mechanism, means for supporting a propeller comprising a semi-circular shouldered skirt, swinging arcuate arms mounted on opposite sides thereof, and means to interlock the free ends of said arms to cause them to engage with the shank of the propeller and lock said shank on the shoulder of said skirt.

15. In a propeller balancing mechanism, means for supporting a propeller comprising a semi-circular shouldered skirt, swinging arcuate arms mounted on opposite sides thereof, and means to interlock the free ends of said arms to cause them to engage with the shank of the propeller and lock said shank on the shoulder of said skirt, said arms having shoulders adjacent their free ends and engaging with the propeller shank.

In testimony whereof, I affix my signature.

FREDERICK CHARAVAY.